Figure 1:
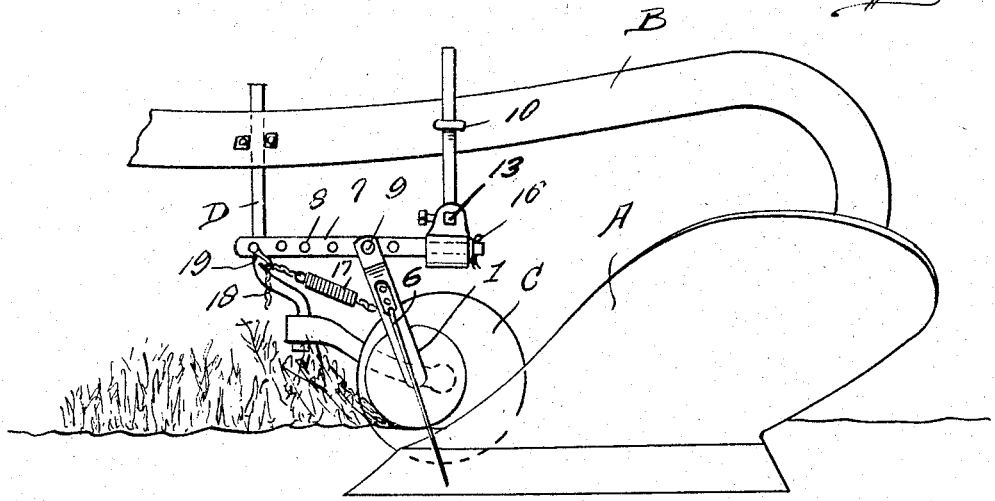

June 10, 1930.  O. G. CHENOWETH ET AL  1,762,258
ROLLER ATTACHMENT FOR PLOWS
Filed Dec. 30, 1927

Inventors
O. G. Chenoweth
C. H. Chenoweth

By Clarence A. O'Brien
Attorney

Patented June 10, 1930

1,762,258

UNITED STATES PATENT OFFICE

OLIVER G. CHENOWETH AND CHARLES A. CHENOWETH, OF LYNN, INDIANA

ROLLER ATTACHMENT FOR PLOWS

Application filed December 30, 1927. Serial No. 243,617.

The present invention pertains to improvements in devices for breaking down weeds or other growth in advance of a plow, in the operation of plowing the ground, the same relating more particularly to a roller attachment for conventional plows, wherein the same is secured to the plow frame in advance of the plow, for breaking down the growth preparatory to the movement of the plow.

The main object of the device resides in providing a roller attachment for plows, wherein the roller may be adjusted with respect to the ground, as well as being provided with means for tensionally maintaining the same against the ground.

Another object resides in providing a device which will effectively press the growth such as sweet clover, weeds, etc., to the ground, after which the usual coulter disk cuts through and severs the weeds so that the plow may effectively turn the same under the surface thus preventing the same from collecting in front of the plow, resulting in the restraining of the normal operation thereof.

After considering the following specification and claim, other novel objects and advantages will readily become apparent.

In the drawing:—

Figure 2:
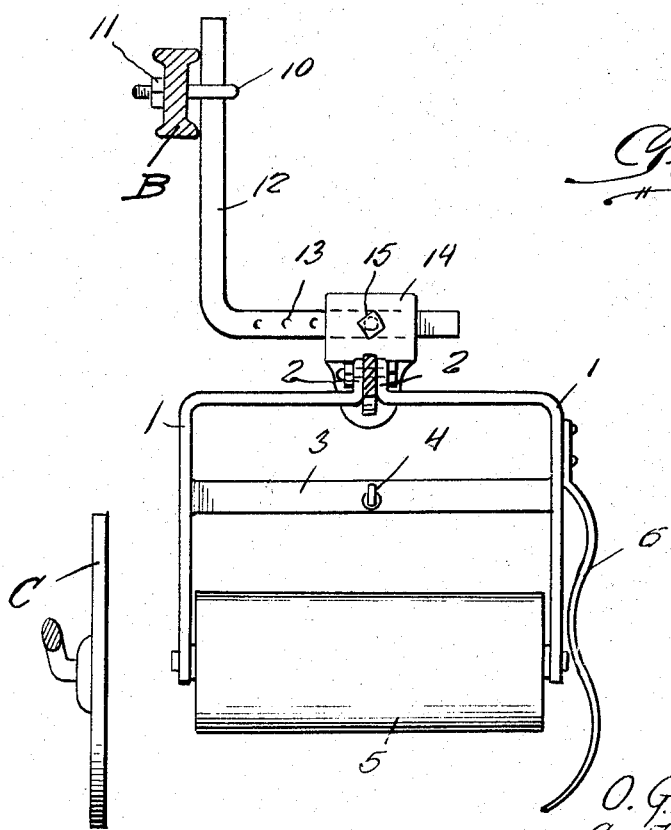

Figure 1 discloses a side elevation of a plow showing the present invention mounted in association therewith, and Figure 2 is a sectional view taken on a line substantially vertically through the beam bar.

Now for a more detailed description of the invention, reference is made to the drawing, in which like numerals designate like parts. For the purpose of illustrating the manner in which the present invention is associated with a plow, in the drawings, the usual plow blade A, is shown, provided with the customary plow beam B.

The type of plow illustrated in these drawings, is of the type generally known as a drag plow. The usual coulter disk C, is adjustably carried by the plow shaft, by the usual post D. The invention includes a pair of L-shaped frame pieces 1—1 the shorter leg portion of each frame being bent outwardly at 2—2, to provide securing means.

The intermediate portion of the frame pieces are united by a connecting bar 3. This bar is provided at its intermediate front side with a hook member 4. Between the opposite ends of the frame pieces, a ground engaging roller 5 is journaled, by having a suitable pintle at each end thereof, projecting through complementary openings in the frame ends.

The coulter disc C is located at one end of the roller in the manner shown and serves to turn down the weeds so that they will be entirely covered when the plow cuts and inverts the furrow slice.

The beam bar 7 is formed with a plurality of spaced longitudinally arranged openings 8, through one of which a bolt 9 may be inserted for connecting the securing means 2—2, thereto.

A U-bolt 10 is fitted through the plow beam B, while nut members 11 are threaded on the ends thereof, for clamping the upper portion of an L-shaped arm 12, against the beam. The lower leg portion of the arm is formed with a plurality of longitudinally spaced openings 13, whereby a block 14 slidable thereon, may be fixed by urging the set screw 15 threaded thereon, into one of these openings. This block is formed with a bore parallel to the disposition of the plow beam, and through which the reduced and preferably rounded rear end portion of the beam 7 projects.

Suitable means 16 may be employed at the end of the beam, to prevent the displacement of the same from the block. A coiled tension spring 17 is connected at one end to the hook member 4, while its opposite end is connected to an end link of a chain 18. A pivotal hook 19 at the forward end of the beam, may be hooked in any one of the chain links, for adjusting the tension of the spring, to effect the proper pressure of the roller on the ground.

It will obviously be seen that an attachment for plows is herein described, which will thoroughly compress the growing weeds in advance of a moving plow, whereby the plow may easily cut through the same, without the liability of collecting the weeds in advance of the plow beam, consequently hindering the proper operation and cut of the plow. Although the preferred construction of the invention is illustrated in the accompanying drawings, such changes as may be necessary to the proper carrying out of the invention in manufacture, may be resorted to without violating the spirit of the invention, or the scope of the appended claim.

Having thus described our invention, what we claim as new is:—

A roller attachment for plows comprising a depending L-shaped arm secured at its upper portion to the usual plow beam, the horizontal portion of the arm being disposed at right angles with respect to said beam, a block adjustable longitudinally on said horizontal portion of the arm, a bar projecting horizontally from said block in a direction parallel to the plow beam, an inverted U-shaped frame pivotally depending from the bar, a roller rotatably mounted between the end portions of the frame, and spring means interposed between the frame and the bar to tensionally maintain the roller against the ground.

In testimony whereof we affix our signatures.

OLIVER G. CHENOWETH.
CHARLES A. CHENOWETH.